UNITED STATES PATENT OFFICE.

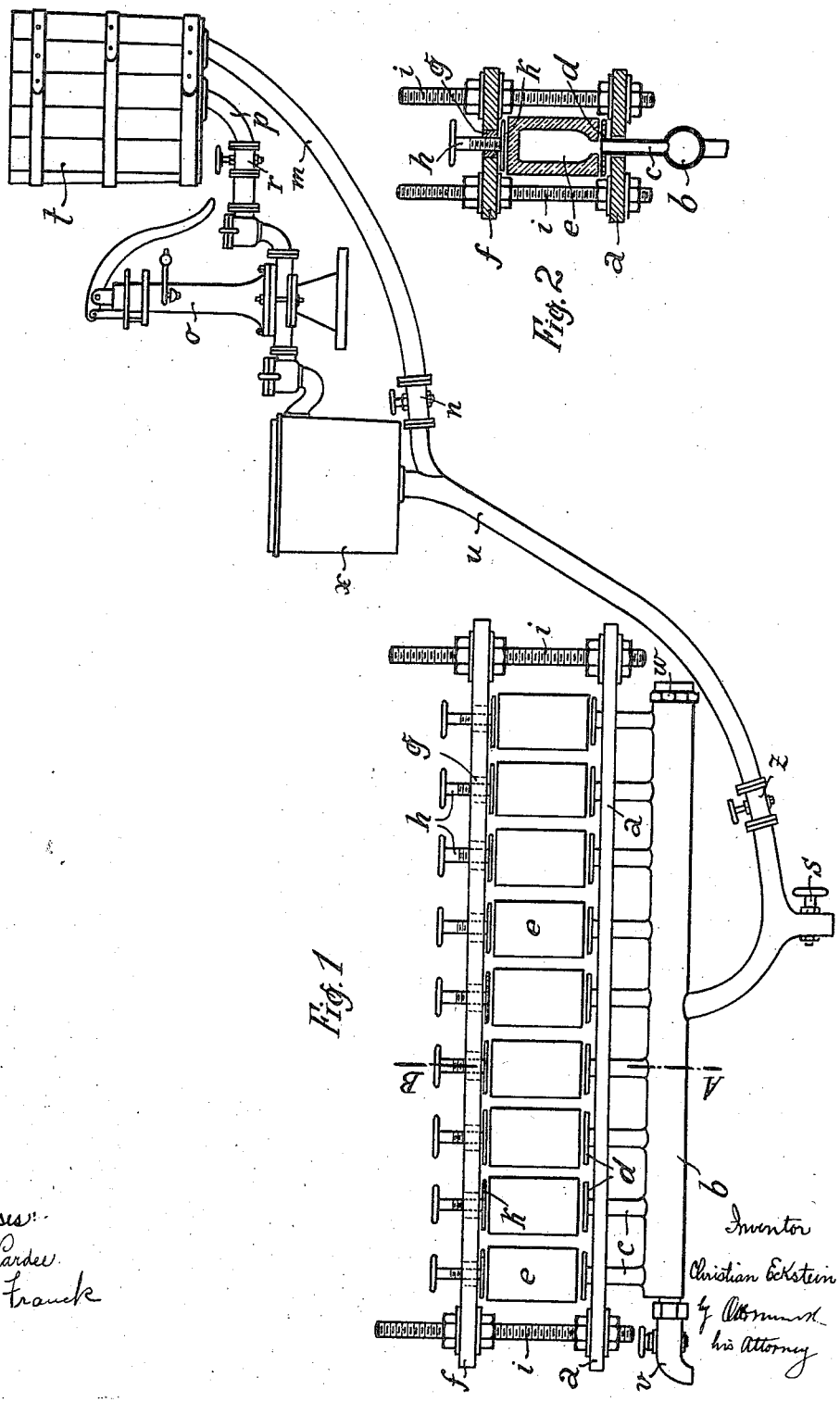

CHRISTIAN ECKSTEIN, OF WEIDEN, GERMANY, ASSIGNOR TO AKTIENGESELLSCHAFT PORZELLANFABRIK WEIDEN, GEBRÜDER BAUSCHER, OF WEIDEN, BAVARIA, GERMANY.

APPARATUS FOR CASTING BODIES OF CERAMIC MASS.

1,163,328. Specification of Letters Patent. Patented Dec. 7, 1915.

Application filed August 4, 1915. Serial No. 43,576.

*To all whom it may concern:*

Be it known that I, CHRISTIAN ECKSTEIN, a subject of Germany, residing at Weiden, Bavaria, Germany, have invented certain new and useful Improvements in Apparatus for Casting Bodies of Ceramic Mass; and I do hereby declare the following to be a full, clear, and exact description of the invention, such as will enable others skilled in the art to which it appertains to make and use the same.

The present invention relates to a method for casting thick-walled hollow bodies or solid bodies of various especially ceramic masses and comprises also an apparatus for carrying out the improved casting method.

Now, this invention consists in that immediately the molds which are open at the bottom only, are filled, the casting mass is pressed in from below with an overpressure. This procedure does not only warrant a very quick, simple and safe manufacture of the said bodies, but also allows the simultaneous casting of any desired number of articles of any desired size and shape.

In order to render the present invention more easily intelligible reference is had to the accompanying drawing which illustrates an apparatus for carrying the casting method into effect.

Figure 1 is a plan and Fig. 2 a cross section on line A—B of Fig. 1.

As may be seen from the drawing the apparatus consists of a horizontally arranged receptacle $b$, for instance, a tube, which may be provided with vertically upwardly extending pipe sockets $c$, which are distanced one from another so as to correspond to the molds to be employed and may be arranged in any desired number. The said pipe sockets extend through corresponding borings of a plate $a$, and are on their top ends provided with broad flanges $d$. On their outer ends the plate $a$ possesses carriers $i$, which are screw threaded and support a second plate $f$, which is parallel to the plate $a$ and may be adjusted in relation to the same by means of nuts $i'$. In coincidence with the axis of each of the pipes $c$ thread-boxes $g$ are provided in the plate $f$, and each of the said thread boxes possesses a screw spindle $h$. Between the two plates $a$ and $f$ and coaxially with the pipes $c$ and spindles $h$ there are located the molds $e$, which have an opening each at their bottoms, which openings coincide with the mouths of the pipes $c$. By means of the adjustable plate $f$ the molds $e$ may be fastly pressed upon the flanges $d$. By means of the screw spindles $h$ any desired mold of the series may individually and independently of the others of the series pressed more or less intensively toward the plate $a$.

The flanges $d$ are preferably provided with a packing plate of rubber or the like and likewise the top part of each mold is covered with a metal disk $k$ against which the screw spindle $h$ presses in order to prevent the mold from becoming damaged by the pressure.

At a level somewhat higher than the mold frame work $a$, $f$, $i$ there is arranged a receptacle $t$, containing the molding mass. A conduit $m$, $u$ into which a cut-off valve $n$ is arranged leads from the receptacle $t$ to the tube like receptacle $b$. The conduit $u$ possesses an outlet-valve $s$ near the receptacle $b$. Another conduit $p$, provided with the cut-off valve $r$, leads from the receptacle $t$ to the conduit $u$. In the last mentioned branch conduit there is arranged a pressure generating device, such, for instance, as a hand-pump $o$, by means of which the molding mass may be forced under pressure into the receptacle $x$ and from there to the conduit $u$. On the front side of the receptacle $b$ there is arranged an outlet cock $v$ and on its rear side a detachable cover so that the receptacle may be cleaned as soon as it gets clogged.

The method for manufacturing cast bodies by means of the device above described is as follows:—As soon as the molds are, either by the plate $f$ or by the spindles $h$, fastly pressed against the pipe sockets $c$, so that both parts are lying tightly against each other, the molding mass, such, for instance, as slip is fed from the receptacle $t$, after having closed the cock $r$ and opened the cock $n$, through the conduits $m$, $u$ to the mold $c$ with the natural pressure of gravitation. As soon as the molds $c$ are filled up the valve $n$ is closed and consequently the conduit $m$ blocked. Now the valve $r$ is opened so that the molding mass is pressed by means of the pump $s$ through conduit $p$, receptacle $x$ and conduit $u$ into the molds $e$, the pressure of the pump being maintained upon a height, which depends on the circumstances present. Owing to the considerable pressure the liquid of the molding mass, mostly water, is at first forced into the molds and then pressed through the same. To enable this the molds have a suitable structure; they are, for instance, porous. By removing the water, from the casting mass in the molds, the molding mass gets gradually densified and forms the socalled body. As soon as the bodies to be cast possess the proper strength of body, the pump $c$ is cut-off again, the valve $z$ is closed and in turn the conduits $p$, $u$ are cut-off, whereupon the superfluous molding mass in the molds i. e. so much as is necessary for freeing the molds from superfluous mass (slip), is allowed to flow off through the outlet valve $s$, without necessitating the molds to be moved out of their stationary position. As soon as this is performed, the molds may be removed from the frame work and emptied.

The receptacle $b$, being arranged transversely as regards the molds, holds a considerable quantity of molding mass so that a certain uniform pressure may be upheld in the molds for a longer time, which is necessary when manufacturing such bodies, especially ceramic ones.

I claim as my invention:—

1. In an apparatus for casting bodies of ceramic mass, such, for instance, as porcelain mass the combination of a horizontal tube like receptacle, a plate, arranged over the said horizontal receptacle and having a series of borings, a series of pipe sockets extending upwardly from the said horizontal receptacle and through the borings in the said plate, another plate, adjustable in relation to the first mentioned plate and having a series of thread boxes, a series of screw spindles in the said thread boxes, a series of molds arranged between the two plates coaxially with the said pipe sockets, means for feeding the molding mass to the said horizontal receptacle and means for generating an overpressure in the said horizontal receptacle, substantially as described.

2. In an apparatus for casting bodies of ceramic mass, such, for instance, as porcelain mass the combination of a horizontal tube like receptacle, a plate, arranged over the said horizontal receptacle and having a series of borings, a series of pipe sockets extending upwardly from the said horizontal receptacle and through the borings in the said plate, another plate, adjustable in relation to the first mentioned plate and having a series of thread boxes, a series of screw spindles in the said thread boxes, a series of molds arranged between the two plates coaxially with the said pipe sockets, a receptacle, located at a level higher than that of the horizontal receptacle, a main conduit, leading from the higher receptacle to the horizontal receptacle, cut off valves in the said conduit, an auxiliary conduit, a cut off valve in the auxiliary conduit, a pump and another receptacle, communicating with the main conduit, means for allowing the horizontal receptacle to be cleaned, substantially as described.

3. In an apparatus of the kind as specified, the combination of a highly positioned receptacle containing the molding mass, a deeply positioned horizontal receptacle, a frame work, consisting of two plates adjustable against each other, a series of molds, open at the bottom and arranged within the said frame work, means for feeding molding mass to the horizontal receptacle, means for feeding the molding mass from the horizontal receptacle to the molds from below under the natural pressure of gravitation, means for pressing the bottom openings of the molds fastly against the molding mass feeding means, means for individually pressing each mold against its molding mass feeding means and means for generating an over pressure in addition to the pressure of gravitation, substantially as described.

In testimony whereof I affix my signature in the presence of two witnesses.

CHRISTIAN ECKSTEIN.

Witnesses:
  OSCAR BOCK,
  L. K. WINANS.